(12) United States Patent
Bartolutti et al.

(10) Patent No.: US 6,350,148 B1
(45) Date of Patent: Feb. 26, 2002

(54) METHOD AND DEVICE FOR DETECTING THE PRESENCE OF A PATCH CORD CONNECTOR IN A TELECOMMUNICATIONS PATCH SYSTEM

(75) Inventors: Stephen Craig Bartolutti, Suwanee, GA (US); Golam Mabud Choudhury, Somerset County; Michael Gregory German, Secaucus, both of NJ (US); Daniel Warren Macauley, Fishers, IN (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/247,270

(22) Filed: Feb. 10, 1999

(51) Int. Cl.[7] ............................ H01R 3/00; H01R 29/00
(52) U.S. Cl. ..................... 439/489; 439/188; 439/490
(58) Field of Search ........................ 439/49, 188, 489, 439/490; 200/51.03, 51.09

(56) References Cited

U.S. PATENT DOCUMENTS 3,573,789 A    4/1971  Sharp et al.
3,573,792 A    4/1971  Reed
5,111,408 A    5/1992  Amajadi
5,233,501 A  * 8/1993  Allen et al. .................. 361/733
5,818,128 A  * 10/1998 Hoffman et al. ............ 307/116

FOREIGN PATENT DOCUMENTS

WO          9602888       2/1996

* cited by examiner

Primary Examiner—Brian Sircus
Assistant Examiner—Chaudrike Prasad
(74) Attorney, Agent, or Firm—Gibbons, Del Deo, Dolan, Griffinger & Vecchione

(57) ABSTRACT

A system having a plurality of tracing interface modules that attach to the patch panels of a telecommunications patching system in a telecommunications closet. On the patch panels in a telecommunications closet are located a plurality of connector ports that receive the terminated ends of patch cords. The tracing interface modules mount to the patch panels and provide a mechanical sensor that can detect when a patch cord connector has been added to, or removed from, a connector port within the telecommunications closet. Accordingly, by connecting a computer controller to the various mechanical sensors, the computer can monitor and log all changes to the patch cord interconnections in an automated fashion.

8 Claims, 4 Drawing Sheets

METHOD AND DEVICE FOR DETECTING THE PRESENCE OF A PATCH CORD CONNECTOR IN A TELECOMMUNICATIONS PATCH SYSTEM

RELATED APPLICATIONS

This application is related to the following co-pending applications, the disclosures of which are incorporated into this specification by reference.

U.S. patent application Ser. No. 09/247,613, entitled SYSTEM AND METHOD FOR ADDRESSING AND TRACING PATCH CORDS IN A DEDICATED TELECOMMUNICATIONS SYSTEM;

U.S. patent application Ser. No. 09/247,614, entitled SYSTEM AND METHOD OF OPERATION FOR A TELECOMMUNICATIONS PATCH SYSTEM;

U.S. patent application Ser. No. 09/247,269, entitled TRACING INTERFACE MODULE FOR PATCH CORDS IN A TELECOMMUNICATIONS PATCH SYSTEM;

U.S. patent application Ser. No. 09/247,385, entitled DISPLAY PANEL OVERLAY STRUCTURE AND METHOD FOR TRACING INTERFACE MODULES IN A TELECOMMUNICATIONS PATCH SYSTEM;

U.S. patent application Ser. No. 09/247,237, entitled METHOD AND DEVICE FOR DETECTING THE PRESENCE OF A PATCH CORD CONNECTOR IN A TELECOMMUNICATIONS PATCHING SYSTEM USING PASSIVE DETECTION SENSORS;

U.S. patent application Ser. No. 09/404,420, entitled SYSTEM AND METHOD FOR IDENTIFYING SPECIFIC PATCH CORD CONNECTORS IN A TELECOMMUNICATIONS PATCH SYSTEM; and U.S. patent application Ser. No. 09/404,619, entitled SYSTEM AND METHOD OF INTERCONNECTING TRACING INTERFACE MODULES TO A CENTRAL CONTROLLER IN A TELECOMMUNICATIONS PATCH SYSTEM.

BACKGROUND OF THE INVENTION

1. Field of the Invention

In general, the present invention relates to telecommunications patching systems that are used to selectively interconnect different telecommunications lines to one another using patch cords. More particularly, the present invention relates to telecommunication patching systems that embody patch cord tracing capabilities that help a technician locate the opposite ends of a specific patch cord within the system. The present invention also relates to systems that enable a technician to transmit and receive data with a telecommunications system from a remote location.

2. Description of the Prior Art

Many businesses have dedicated telecommunication systems that enable computers, telephones, facsimile machines and the like to communicate with each other, through a private network, and with remote locations via a telecommunications service provider. In most buildings, the dedicated telecommunications system is hard wired using telecommunication cables that contain conductive wire. In such hard wired systems, dedicated wires are coupled to individual service ports throughout the building. The wires from the dedicated service ports extend through the walls of the building to a telecommunications closet or closets. The telecommunications lines from the interface hub of a main frame computer and the telecommunication lines from external telecommunication service providers are also terminated within the telecommunications closets.

A patching system is used to interconnect the various telecommunication lines within the telecommunications closet. In a telecommunications patching system, all of the telecommunication lines are terminated within the telecommunications closet in an organized manner. The organized terminations of the various lines are provided via the structure of the telecommunications closet. Within the telecommunications closet is typically located a mounting frame. On the mounting frame is connected a plurality of racks. The telecommunications lines terminate on the racks, as is explained below.

Referring to FIG. 1, a typical prior art rack 10 is shown. The rack 10 retains a plurality of patch panels 12 that are mounted to the rack 10. On each of the patch panels 12 are located port assemblies 14. The port assemblies 14 each contain six RJ-45 telecommunication connector ports 16.

Each of the different telecommunication connector ports 16 is hard wired to one of the system's telecommunications lines. Accordingly, each telecommunications line is terminated on a patch panel 12 in an organized manner. In small patch systems, all telecommunications lines may terminate on the patch panels of the same rack. In larger patch systems, multiple racks are used, wherein different telecommunications lines terminate on different racks.

In the shown embodiment of FIG. 1, the interconnections between the various telecommunications lines are made using patch cords 20. Both ends of each patch cord 20 are terminated with connectors 22, such as an RJ-45 telecommunication connector or a RJ-11 telecommunications connector. One end of the patch cord 20 is connected to the connector port 16 of a first telecommunications line and the opposite end of the cord is connected to the connector port 16 of a second telecommunications line. By selectively connecting the various lines the patch cords 20, any combination of telecommunications lines can be interconnected.

In many businesses, employees are assigned their own computer network access number exchange so that the employee can interface with the companies main frame computer or computer network. When an employee changes office locations, it is not desirable to provide that employee with newly addressed telecommunication connection ports. Rather, to preserve consistency in communications, it is preferred that the exchanges of the telecommunication connection ports in the employee's old office be transferred to the telecommunications ports in the employees new office. To accomplish this task, the patch cords in the telecommunication closet are rearranged so that the employee's old exchanges are now received in his/her new office.

As employees, move, change positions, add lines and subtract lines, the patch cords in a typical telecommunications closet are rearranged quite often. The interconnections of the various patch cords in a telecommunications closet are often logged in either paper or computer based log. However, technicians often neglect to update the log each and every time a change is made. Inevitably, the log is less than 100% accurate and a technician has no way of reading where each of the patch cords begins and ends. Accordingly, each time a technician needs to change a patch cord, that technician manually traces that patch cord between two connector ports. To preform a manual trace, the technician locates one end of a patch cord. The technician then manually follows the patch cord until he/she finds the opposite end of that patch cord. Once the two ends of the patch cord are located, the patch cord can be positively identified.

It takes a significant amount of time for a technician to manually trace a particular patch cord. Furthermore, manual tracing is not completely accurate and technicians often accidently go from one patch cord to another during a manual trace. Such errors result in misconnected telecommunication lines which must be later identified and corrected.

In order for a tracing system to work in an automated fashion, the tracing system must embody some mechanism for detecting when a patch cord has been added to or detached from a specific connector port. A need therefore exists in the field of telecommunication patching systems for a system that can trace, detect and identify the ends of each patch cord in a telecommunications closet in an automated fashion, thereby reducing the labor and inaccuracy of manual tracing procedures.

SUMMARY OF THE INVENTION

The present invention is part of patch cord tracing system for tracing patch cords in a telecommunications patching system. The system includes a plurality of tracing interface modules that attach to the patch panels in a telecommunications closet. On the patch panels in a telecommunications closet are located a plurality of connector ports that receive the terminated ends of patch cords. The tracing interface modules mount to the patch panels and provide a mechanical sensor that can detect when a patch cord connector has been added to, or removed from, a connector port within the telecommunications closet. Accordingly, by connecting a computer controller to the various mechanical sensors, the computer can monitor and log all changes to the patch cord interconnections in an automated fashion.

BRIEF DESCRIPTION OF THE DRAWINGS

For a better understanding of the present invention, reference is made to the following description of and exemplary embodiment thereof, considered in conjunction with the accompanying drawings, in which.

DETAILED DESCRIPTION OF THE DRAWINGS

Figure 1:
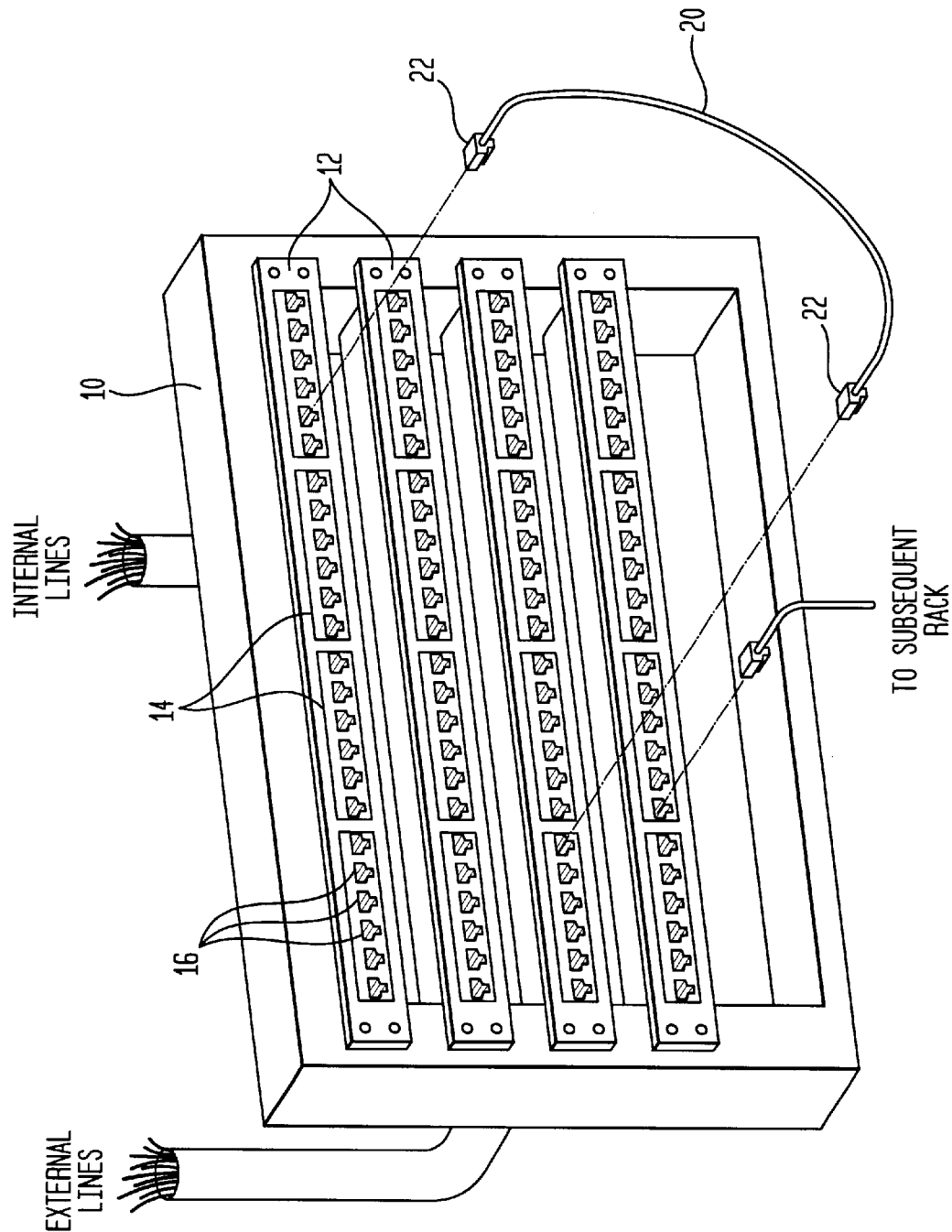
FIG. 1 is a perspective view of a typical prior art telecommunications rack assembly containing multiple patch panels with connector ports that are selectively interconnected by patch cords.
Figure 2:
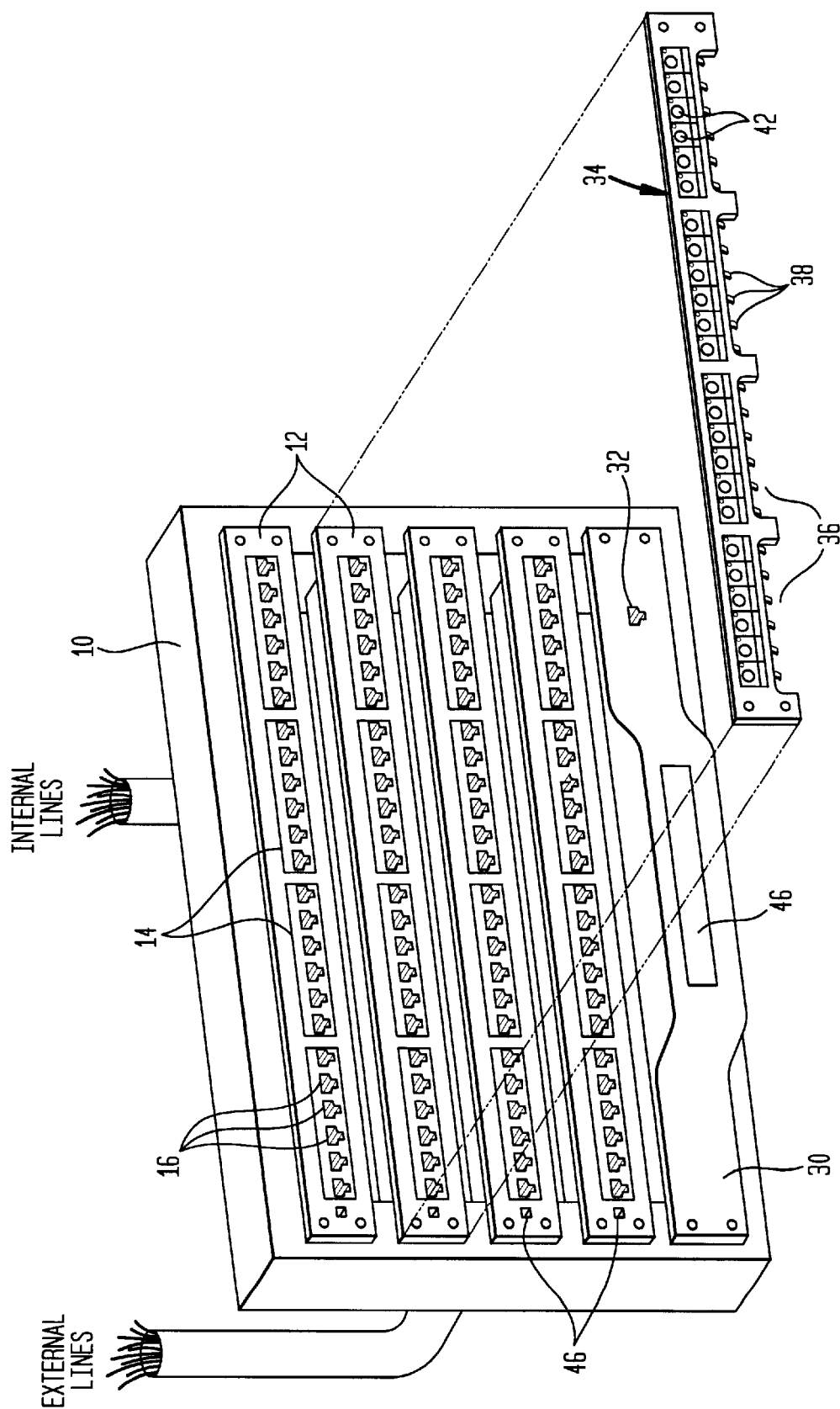
FIG. 2 is a perspective view of a tracing interface module and rack controller in accordance with the present invention, shown in conjunction with the prior art telecommunications rack assembly of FIG. 1.

Referring to FIG. 2, a conventional telecommunications rack 10 is shown, such as the one previously described in regard to FIG. 1. The telecommunications rack 10 contains a plurality of patch panels 12 that are mounted in parallel horizontal rows within the rack 10. Each of the patch panels 12 contains a plurality of patch port assemblies 14. The connector ports 16 associated with each of the patch port assemblies 14 are hard wired to the various lines that enter the telecommunications closet.

In the present invention system, a rack controller 30 is mounted to each rack 10 in the overall patch system. The rack controller 30 contains a central processing unit (CPU).

The CPU is capable of independently running line tracing programs and also contains a remote access port 32 that enables the CPU to be accessed by a remote computer. Remote access of the rack controller is the subject of related co-pending patent application Ser. No. 09/247,614, entitled System And Method Of Operation For A Telecommunications Patch System, which has already been incorporated into this application by reference.

The purpose of the rack controller 30 is to operate and gather data from the various tracing interface modules 34, as will be later explained. The tracing interface modules 34 are modules that mount to the face of each patch panel 12 on the rack 10. The tracing interface modules 34 surround the various connector ports 16 located on a patch panels 12 and provide an interface through which data about each connector port 16 can be transmitted to and from the rack controller 30.

The tracing interface module 34 can have multiple different configurations. The structure and different configurations of the tracing modules are disclosed in related co-pending patent application Ser. No. 09/247,269, entitled Tracing Interface Module For Patch Cords In A Telecommunications Patch System; patent application Ser. No. 09/247,385, entitled Display Panel Overlay Structure And Method For Tracing Interface Modules In A Telecommunications System; and patent application Ser. No. 09/247,237, entitled Method And Device For Detecting The Presence Of A Patch Cord Connector In A Telecommunications Patch System. These applications have already been incorporated into this application by reference.

In the shown embodiment, the tracing interface module 34 contains a rectangular relief 36 that surrounds the connector ports 16 on each patch port assembly 14 when the tracing interface module 34 is connected to the patch panels 12. In FIG. 2, it can be seen that extending into each rectangular relief 36 is a plurality of hinged levers 38. Each hinged lever 38 corresponds in position with one of the connector ports 16 on the patch panel 12. As the terminated end of a patch cord 20 (FIG. 1) is connected to a connector port 16, the presence of the patch cord causes the hinged lever 38 to fold inwardly.

Figure 3:
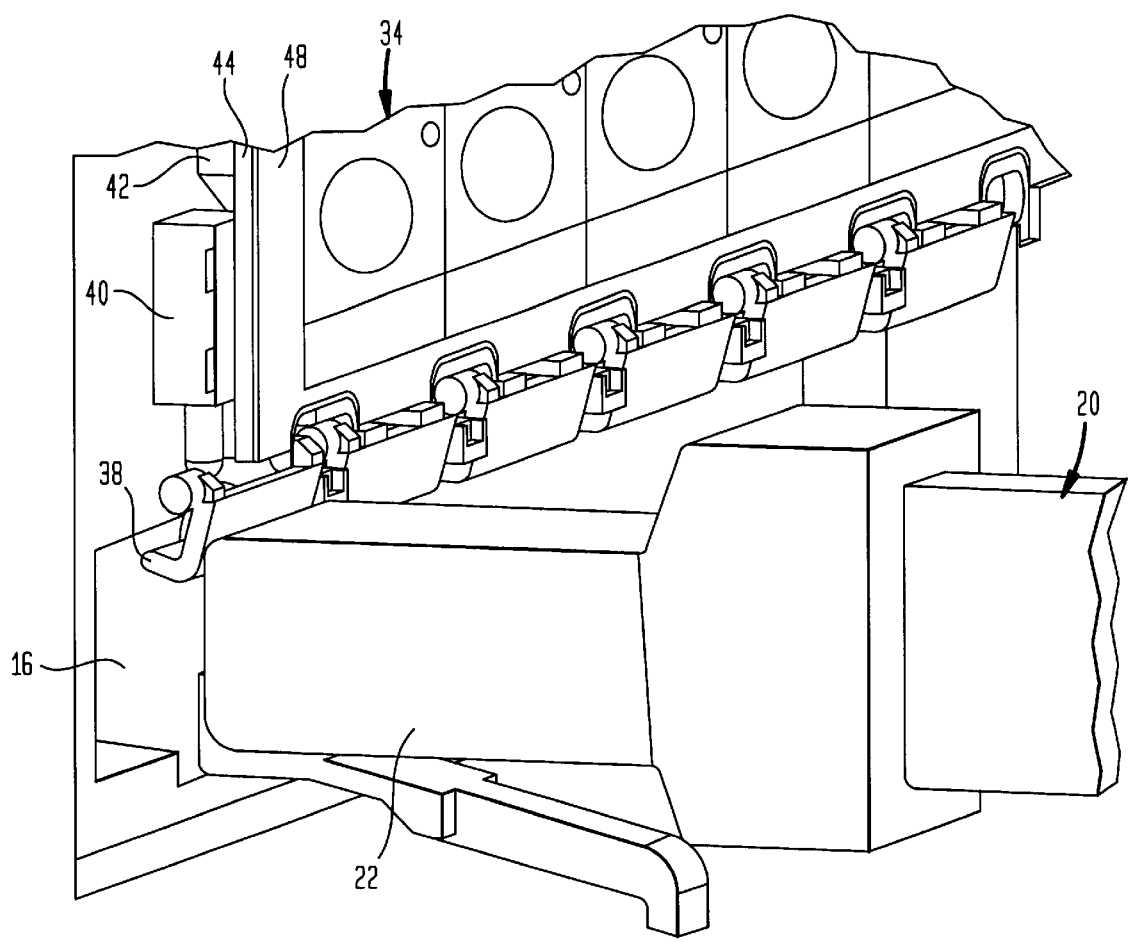
FIG. 3 is an enlarged, fragmented, view of a section of a tracing interface module attached to a prior art patch panel.

Referring to FIG. 3, it can be seen that a microswitch 40 is located within the structure of the tracing interface module 34 behind each hinged lever 38. As a patch cord connector 22 passes into a connector port 16, the patch cord connector 22 moves the hinged lever 38 and causes the hinged lever 38 to activate the microswitch 40.

Each microswitch 40 is monitored by the rack controller 30 (FIG. 2). The rack controller is therefore capable of automatically determining when a patch cord connector 22 has been added to, or removed from, any connector port 16 on the rack. The rack controller is therefore capable to monitoring any and all changes that occur to the patch cords 20 in the patch system over time. The rack controller therefore is capable of automatically keeping an accurate log of all changes that have occurred to the patch cords 20 since the installation of the present invention system. Accordingly, if a technician is servicing the patch system, that technician can read the accurate log straight from the rack controller. The log can be read out on the display 46 (FIG. 2) on the rack controller 30 or can be remotely accessed via the connector port 32 (FIG. 2) on the rack controller 30.

By positioning the hinged lever 38 and microswitch 40 within the structure of the tracing interface module 34, these elements can be retroactively added to many existing telecommunication patch systems. The tracing interface module 34 is comprised of a support frame 42, a printed circuit board 44 and a graphics overlay 48. The support frame 42 is a molded element that provides rigidity to the printed circuit board 44 and the graphics overlay 48. The hinged lever 38 extends from the bottom edge of the support frame 42, wherein the support structure 42 is molded to receive the hinged lever 38. A complete description of the structure of components comprising the tracing interface module 34 is disclosed in co-pending patent application Ser. No. 09/247,269, entitled, TRACING INTERFACE MODULE FOR PATCH CORDS IN A TELECOMMUNICATIONS PATCH SYSTEM, which has already been incorporated into this specification by reference.

Although a tracing system can be retroactively added to existing telecommunications patch system by utilizing trace interface modules 34, new telecommunications patch systems can be manufactured with integral tracing capabilities. In such a new design, the features of the previously described tracing interface module 34 (FIG. 2) can be incorporated into the design of the patch port assemblies 14 (FIG. 2) present on the patch panel 12 (FIG. 2).

Figure 4:
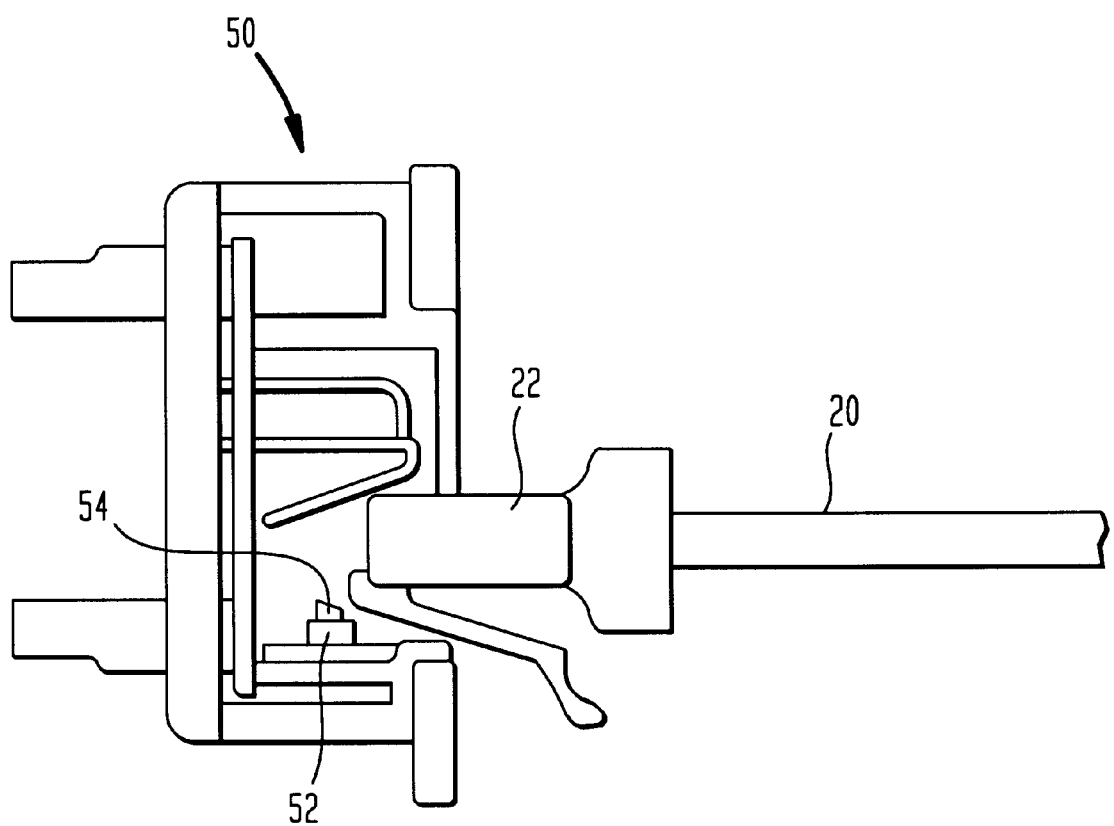
FIG. 4 is a cross-sectional view of a patch port assembly having an internal mechanical switch sensor.

Referring to FIG. 4, an exemplary patch port assembly design 50 is shown that contains an internal mechanical switch 52. The mechanical switch 52 has an activator 54 that is contacted by the patch cord connector 22, when the patch cord connector 22 is inserted into a connector port on the patch port assembly 50. Accordingly, the physical state of the switch 52 is altered each time patch cord connector 22 is either inserted into or removed from a connector port.

There are many locations within a patch port assembly 50 where a mechanical switch 52 can be placed. Some alternate locations and types of mechanical switches are disclosed in co-pending patent application Ser. No. 09/210,292, entitled A Fiber Distribution Shelf Assembly For A Fiber Administration System Having Integral Line Tracing Capabilities, the disclosure of which is herein incorporated by reference.

In addition to keeping an accurate log of all physical patch cord changes, the present invention system can also be used to accurately trace the end points of any patch cord 20. For instance, suppose a technician wants to find the opposite end of a particular patch cord 20. That technician can remove a patch cord connector 22 from a particular connector port. Once a patch cord connector 22 is removed, the switch in that connector port reads the change to the rack controller 30 (FIG. 2). The rack controller can then identify the opposite end of the cord that was removed.

It will be understood that the embodiment of the present invention specifically shown and described is merely exemplary and that a person skilled in the art can make alternate embodiments using different configurations and functionally equivalent components. For example, there can be many different mechanical switch activation mechanisms that can be used other than the few that are specifically described and referenced. All such alternate embodiments are intended to be included in the scope of this invention as set forth in the following claims.

What is claimed is:

1. A patch cord tracing module assembly that is adapted to be affixed to the face of a patch panel having a plurality of connector ports aligned in a row in a telecommunications system, comprising:

a circuit board containing a plurality of mechanical switches thereon aligned in a row;

a support frame for supporting said circuit board, said support frame having a bottom edge and a plurality of hinged levers pivotally extending from said bottom edge, wherein each of said hinged levers engages and activates a corresponding one of said mechanical switches when biased toward that mechanical switch by a predetermined force.

2. The assembly according to claim 1, further including a graphics overlay affixed to said circuit board, wherein said graphics overlay contains a visual indicator that identifies different locations on said patch cord tracing module that correspond in position with said mechanical switches.

3. A telecommunications system having point-to-point tracing capabilities, comprising:

at least one rack structure;

a plurality of patch panels mounted to each said rack structure and having an outer face;

a plurality of connector ports disposed on each of said patch panels;

a plurality of patch cords for selectively interconnecting different pairs of connector ports;

tracing modules mounted to said outer face of said patch panels above said connector ports, wherein said tracing modules contain mechanical switches that detect the presence of a patch cord in each connector port.

4. The system according to claim 3, further including a controller on each said rack structure that is coupled to each of said mechanical switches in said tracing modules.

5. The system according to claim 3, wherein said tracing module contains:

a circuit board upon which said mechanical switches are mounted;

a support frame for supporting said circuit board, said support frame containing a plurality of hinged levers that correspond in position to said mechanical switches, wherein said hinged levers engage and activate said mechanical switches when contacted by a patch cord when that patch cord is inserted into one of said connector ports.

6. A method of detecting the presence of a patch cord connector in a connector port within a telecommunications closet, comprising the steps of;

providing a mechanical switch proximate each of the connector ports by positioning a mechanical switch at a point external to each of the connector ports, wherein each mechanical switch within a connector port is activated by the insertion of a patch cord connector into that connector port;

coupling each of said mechanical switches to a controller that monitors the switching status associated with each of said mechanical switches.

7. The method according to claim 6, wherein said step of providing a mechanical switch includes the step of attaching a tracing module in front of each connector port, wherein each said mechanical switch is contained within said tracing module.

8. The method according to claim 7, wherein said tracing module contains:

a circuit board upon which each said mechanical switch is mounted;

a support frame for supporting said circuit board, said support frame containing a plurality of hinged levers that correspond in position to each said mechanical switch, wherein a hinged lever engages and activates each of said mechanical switches when contacted by a patch cord when that patch cord is inserted into one of said connector ports.

* * * * *